Aug. 25, 1925.
C. R. McBROOM
1,551,414
FRICTION BLOCK
Filed April 3, 1924
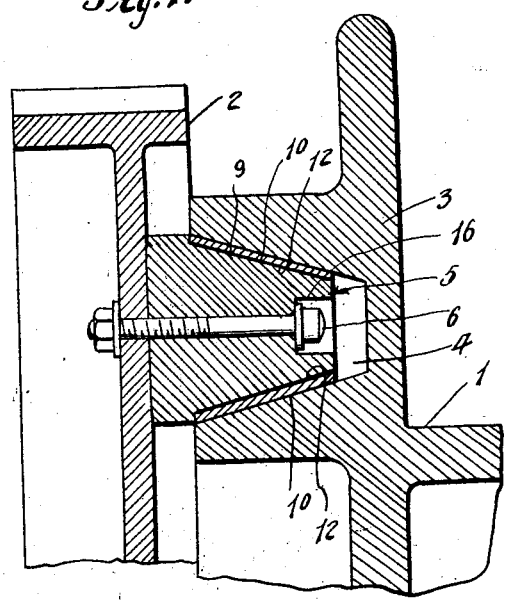
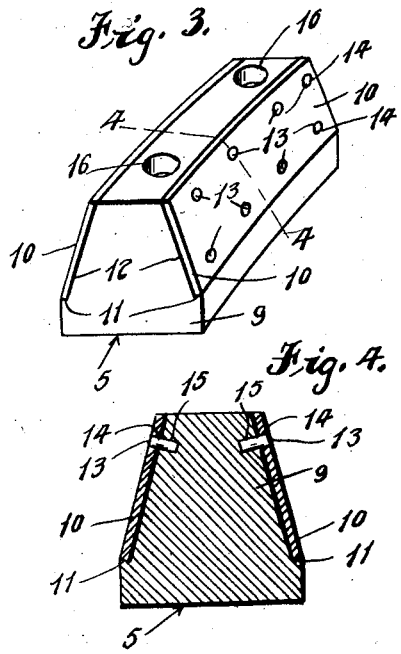
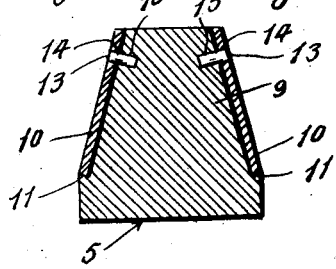
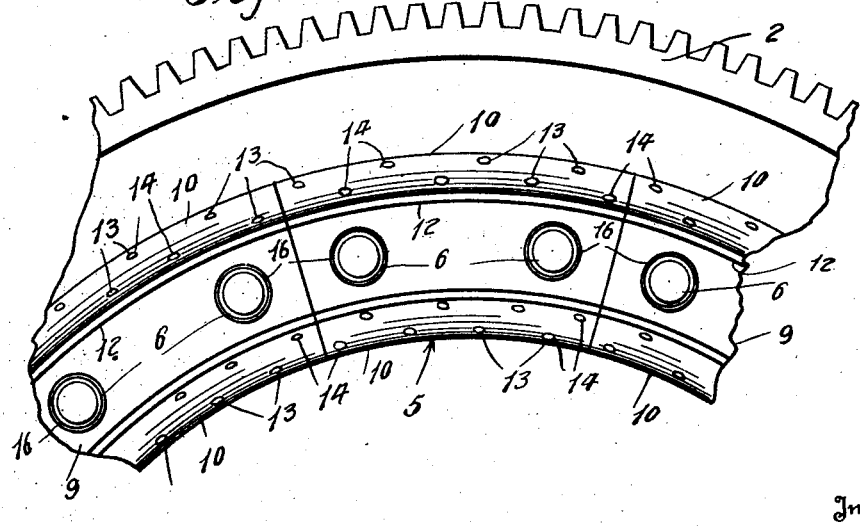
Inventor
C. R. McBroom.
By
Attorney Patented Aug. 25, 1925.

1,551,414

UNITED STATES PATENT OFFICE.

CASSIUS R. McBROOM, OF ABERDEEN, WASHINGTON.

FRICTION BLOCK.

Application filed April 3, 1924. Serial No. 704,020.

*To all whom it may concern:*

Be it known that I, CASSIUS R. MCBROOM, a citizen of the United States, residing at Aberdeen, in the county of Grays Harbor and State of Washington, have invented certain new and useful Improvements in Friction Blocks; and I do hereby declare the following to be a full, clear, and exact description of the invention, such as will enable others skilled in the art to which it appertains to make and use the same.

My invention relates to friction clutches, and more particularly to improvements in friction blocks of clutches of the type employed to establish a driving connection between a drum and its driving gear.

The invention has for one of its objects the provision of a friction block of the character stated which will last for a comparatively long time, which will have the required holding power, and which will release quickly, and to attain these ends I provide a friction block embodying a base of wood and a friction and wear resisting facing of asbestos fabric.

A still further object of the invention is the provision of novel means for securing the facing to the base or body of the block.

With the above and other objects in view, the invention consists in the construction, combination and arrangement of parts hereinafter fully described and claimed.

The friction block is illustrated in the accompanying drawing, wherein:

Figure 1 is a sectional view of a fragmentary portion of a drum and its driving gear equipped with a clutch embodying friction blocks constructed in accordance with my invention, Figure 2 is a view in side elevation of a fragmentary portion of the gear with the friction blocks secured thereto, Figure 3 is a detail perspective view of the friction block, and Figure 4 is a sectional view taken on the plane indicated by the line 4—4 of Figure 3.

Referring to the drawing by reference numerals, 1 designates a fragmentary portion of a drum and 2 a fragmentary portion of a gear for rotating the drum. The head 3 of the drum is provided with an annular groove 4 to receive an annular series of friction blocks 5 secured by bolts 6 to the gear 2. The side walls of the groove 4 and the sides of the blocks 5 are reversely inclined. The blocks 5 and the side walls of the groove 4 constitute a clutch by which a driving connection is established between the drum 1 and the gear 2. The structure thus far described is old and forms no part of the present invention.

In accordance with my invention, the base or body 9 of each block 5 is made of wood, preferably Australian gum wood. The block 5 is provided with a friction and wear resisting facing which consists of strips 10 of an asbestos fabric. The sides of the base or body 9 are provided with recesses having inner end walls 11 and outwardly and inwardly inclined side walls 12. The facing strips 10 are secured in the recesses in contact with the walls 11 and 12, and this is accomplished by means of a suitable cement and dowel pins 13. The dowel pins 13 are preferably made of vulcanized red fiber, and they pass through openings 14 in the facing strips 10 into sockets 15 in the base or body 9. The dowel pins 13 are secured in place by a suitable cement. The base or body 9 is provided with openings 16 for the reception of the bolts 6, and it has, as clearly shown in Figure 2, a lengthwise curvature.

In practice, after the base or body 9 has been formed as illustrated and described, the facing strips 10 are set in the recesses and temporarily secured therein by clamps. The body 9 and facing strips 10 are then drilled simultaneously to provide the openings 14 and sockets 15. After this has been done, the facing strips 10 are removed and a thin layer of plastic high heat cement is applied to the walls 11 and 12 of the recesses and in the openings 14 and sockets 15. The facing strips 10 are now replaced and the dowel pins 13 driven in the openings 14 and sockets 15, and these parts are held in place by clamps under the desired pressure until the cement has had time to set. After the removal of the clamps, and after any finishing work found necessary has been done, the block is ready for the market.

While my improved friction block is illustrated and described as forming a part of a particular clutch, and provided with two facing strips, it is to be understood that it may be used as a part of many other friction clutches, and that it may be provided with only one facing strip when conditions require the use of but one.

From the foregoing description, taken in connection with the accompanying drawing, it should be apparent that I have provided a friction block which is simple, durable and effective, which may be manufactured and sold at a comparatively low cost, and which will meet all requirements of the trade.

The facing strips 10 are preferably made from the asbesto-metallic friction material, but it is to be understood that I do not limit myself to the use of this particular material for the reason that there are many other friction and wear resisting materials from which satisfactory facing strips may be made.

What is claimed is:—

1. A friction block for clutches, comprising an arcuate body of wood having its curved sides oppositely inclined, facings of asbestos fabric applied to said sides, and dowel pins of vulcanized red fiber passing through said facings and entering the body.

2. A friction block for clutches, comprising an arcuate body of Australian gum wood having its curved sides oppositely inclined, facings of asbesto-metallic friction material applied to said sides, and dowel pins of vulcanized red fiber passing through said facings into the body.

3. A friction block for clutches, comprising an arcuate body having its curved sides inclined in opposite directions and provided at the inner longitudinal edges of said sides with shoulders, strips of friction material applied to said sides with their inner longitudinal edges in contact with said shoulders, and non-metallic dowel pins passing through the strips and entering the body.

4. A friction block for clutches, comprising a body of wood, facings of fabric secured to opposite sides of the body, and non-metallic dowel pins passing through the facings and entering the body and secured to both of these parts.

In testimony whereof I affix my signature.

CASSIUS R. McBROOM.